(12) United States Patent
Ferrin et al.

(10) Patent No.: US 9,978,264 B2
(45) Date of Patent: May 22, 2018

(54) METHOD FOR DEVICE INTERACTION AND IDENTIFICATION

(71) Applicant: 16Lab Inc, Kamakura (JP)

(72) Inventors: Rafael Ferrin, Tokyo-to (JP); Tõnu Samuel, Yokohama (JP); Jan Rod, Singapore (SG)

(73) Assignee: 16Lab Inc, Kamakura (JP)

( * ) Notice: Subject to any disclaimer, the term of this patent is extended or adjusted under 35 U.S.C. 154(b) by 0 days. days.

(21) Appl. No.: 15/247,474

(22) Filed: Aug. 25, 2016

(65) Prior Publication Data

US 2018/0033293 A1      Feb. 1, 2018

Related U.S. Application Data

(60) Provisional application No. 62/367,813, filed on Jul. 28, 2016.

(51) Int. Cl.
| | | |
|---|---|---|
| G05B 19/00 | (2006.01) | |
| G08C 17/02 | (2006.01) | |
| H04L 12/28 | (2006.01) | |
| G06F 3/01 | (2006.01) | |

(52) U.S. Cl.
CPC ............ *G08C 17/02* (2013.01); *G06F 3/017* (2013.01); *H04L 12/282* (2013.01); *H04L 2012/2841* (2013.01)

(58) Field of Classification Search
None
See application file for complete search history.

(56) References Cited

U.S. PATENT DOCUMENTS

| 2016/0202947 A1* | 7/2016 | Ramalingam ........ G02B 27/017 345/156 |
| 2016/0366330 A1* | 12/2016 | Boliek .................. G06F 3/0484 |
| 2017/0168782 A1* | 6/2017 | Boyd ....................... G06F 8/34 |

OTHER PUBLICATIONS

Francillon, A. et al., Relay Attacks on Passive Keyless Entry and Start Systems in Modern Cars, 2010, Retrieved from the Internet on Nov. 22, 2016, <https://eprint.iacr.org/2010/332.pdf>.
Duino, J., Trusted Face in Lollipop, explained, Aug. 4, 2015, Retrieved from the Internet on Nov. 23, 2016, <http://www.androidcentral.com/face-unlock-explained>.

* cited by examiner

*Primary Examiner* — Adolf Dsouza
(74) *Attorney, Agent, or Firm* — Berggren LLP (57) ABSTRACT

A method is provided for device interaction and identification by detecting similar or synchronous movements of two or more electronic devices using two or more Movement Data from two or more involved electronic devices to interact with each other and detect when the movement or motion of involved devices corresponds with certain multi-device gestures or activities.

11 Claims, 8 Drawing Sheets

METHOD FOR DEVICE INTERACTION AND IDENTIFICATION

PRIORITY

This application claims priority of the U.S. provisional application No. 62/367,813 which was filed on Jul. 28, 2016 and the contents of which are incorporated herein by reference.

FIELD OF THE INVENTION

The present invention relates to the field of handheld, mobile, wearable, portable and implantable devices; more specifically, to the field of methods of interacting with devices using handheld, mobile, wearable or implantable devices.

BACKGROUND

Current widely used devices use principles where the interactions and/or identification with a computer or a mobile phone, a wearable or any other kind of device are performed by user actions—buttons, touchscreens, gestures, voice commands, NFC identifications, biometric sensors (like a fingerprint or face detection), pin codes, etc.

Sometimes, the interaction and/or identification is based on a radio signal strength indication (RSSI) from some other physical item—a mobile phone, a smartwatch or a special tag is used to unlock a workstation.

Example of prior art is Apple's WWDC16 feature called "auto unlock" and is using physical proximity as assumption of user presence. While it sounds perfect this is not secure. Computer can be brought to other side of thin wall to unsuspecting user wearing iWatch and malicious auto unlock feature may happen.

It is also common for many current devices to include some passive interactions based on sensor data, where the data is used to extrapolate the intention or desire of the user as well as the convenience of certain actions. Simple example could be the screen brightness control based on light sensor or the screen orientation based on ground detection. More sophisticated cases would be, for example, using activity tracking based on IMU sensors to control the volume of incoming calls depending on that activity, disconnect an alarm if the user is already awake and moving, unlocking a smartwatch screen when a looking-to-the-screen gesture is detected, etc. Often these technologies are combined for creating more trustful and sophisticated interactions and/or identification processes—for example, keyless entry to a car and starting it may require physical action to open the doors, but later just the proximity of a key tag is enough to start the engine. Prior art of keyless entry systems and problems are explained in Francillon, A. et al., Relay Attacks on Passive Keyless Entry and Start Systems in Modern Cars.

The known methods are too complicated processes, do not allow to identify the unauthorized use and don not work properly and therefore insecure.

BRIEF DESCRIPTION OF THE INVENTION

The aim of the present invention is to provide a convenient and secure process for the users of different devices in order to make actions based on their intent.

The aim is achieved by the method according to the present invention by detecting when two or more different sensors of different devices are experiencing the similar or synchronous movements by less steps compared to prior art methods being at the same time more secure than known methods. The data collected from two or more devices is analyzed for similarities. Depending on movement similarity, corresponding predefined action is taken.

The present method enables to verify physical contact of wearer of device to device to be operated. The present method integrates the data of sensors from different devices to define and detect vibrations, gestures, activities and other movements and motions from the user and use defined and detected movements and motions for interaction and identification processes.

The data obtained from the sensors of different devices are used for defining user's activities (same movement, different movements, static . . . ). Later on, those detected activities are used for making decisions related to interactions or identification processes. That data obtained from each device is hereinafter referred to as "Movement Data".

BRIEF DESCRIPTION OF THE DRAWINGS

The preferred embodiment of present invention is explained more precisely with references to figures added, where.

DETAILED DESCRIPTION OF THE INVENTION

Figure 1:
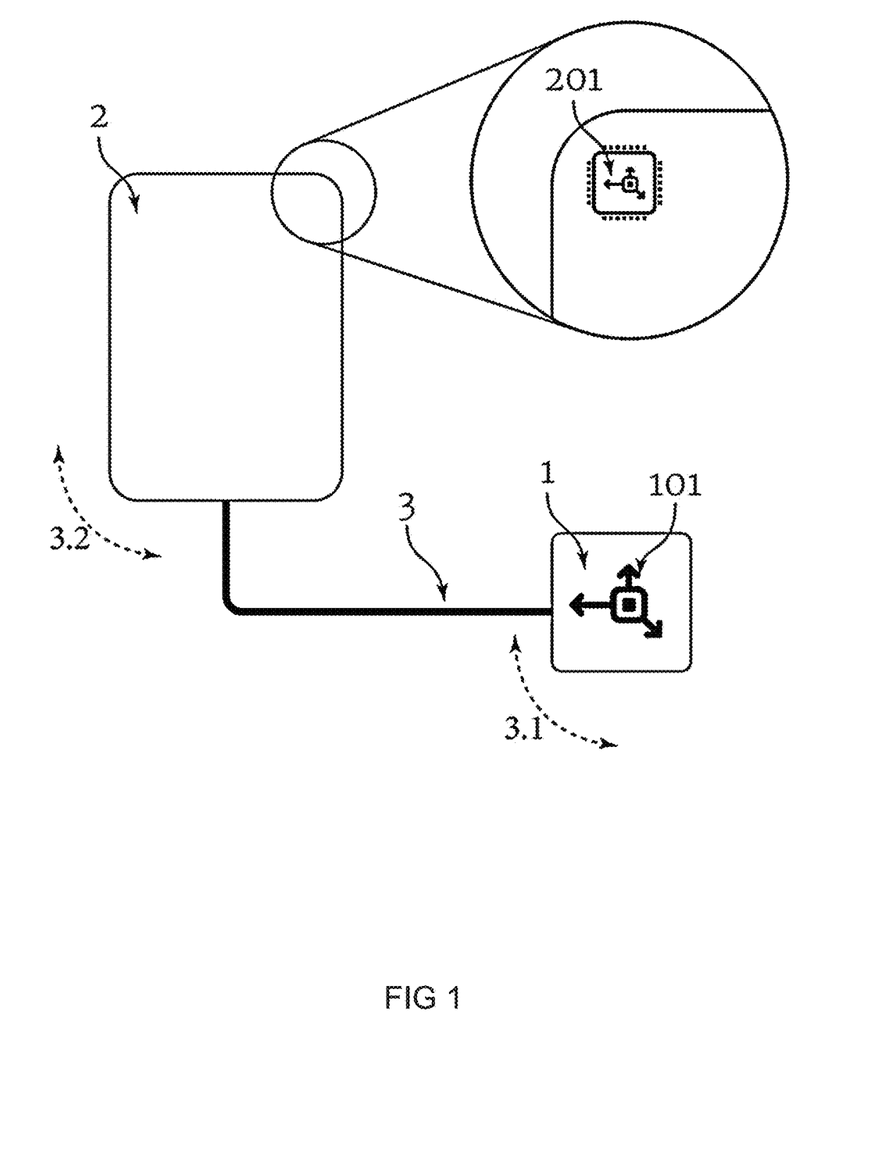
FIG. 1 illustrates the interaction and identification of two or more devices according to the present method.

FIG. 1 illustrates the present method for device interaction and identification by detecting similar or synchronous movements 3 of two, first electronic device 1 comprising movement sensor 101 and second electronic device 2 comprising motion sensor 201, or more electronic devices comprising motion sensor using two or more Movement Data from two or more involved electronic devices to interact with each other and detect when the movement or motion of involved devices corresponds with certain multi-device gestures or activities where movement 3.1 and 3.2 is physically reflected between first electronic device 1 and second electronic device 2 by physical or other link 3. The movement 3 is identified by transmitting the Descriptor Code from first electronic device 1 to the second electronic device 2 and analyzing its similarity with the Descriptor Code of the second electronic device 2.

Figure 2:
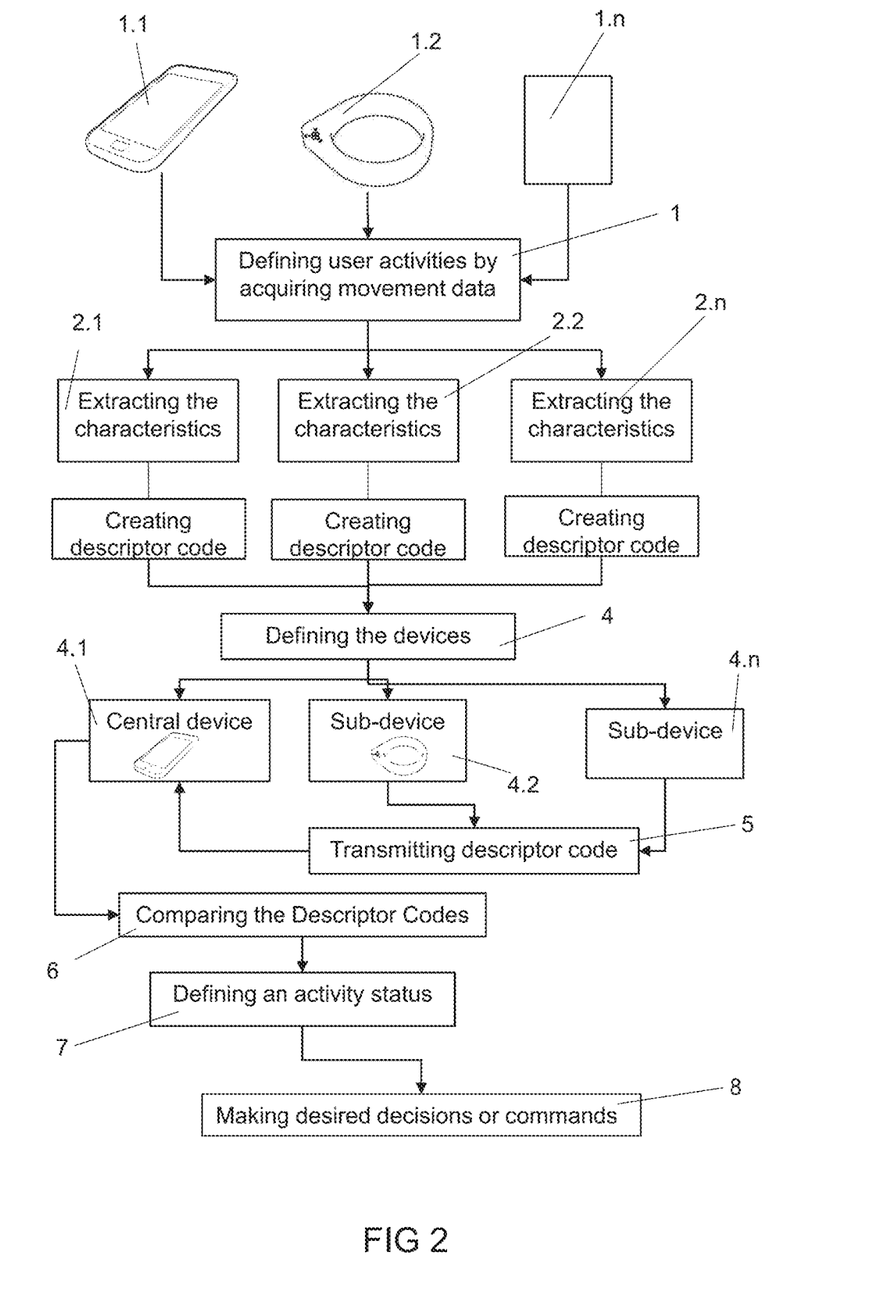
FIG. 2 shows the block scheme according to the present method.

FIG. 2 shows the block scheme according to the present method. The present method for device interaction and identification by detecting similar or synchronous movements of two or more electronic devices using two or more Movement Data from two or more involved devices to interact with each other and detect when the movement or motion of involved devices corresponds with certain multi-device gestures or activities (for example moving together, moving separately, moving one while the other one stays static, a movement is simultaneous (for example the handle of the door turns at the same time than the wearable), indistinctly to the orientations of the devices, and when the movement is almost static but on same/different hands; etc.), comprises following steps:

- Defining user activities by acquiring movement or Movement Data from the sensors of each device of two or more involved devices, wherein the user activity is specific coordinated movement between involved devices, i.e. moving one involved device in respect of other involved device together, separately or moving one while the other one stays static (for example specific coordinated movements, i.e. one turns 90 deg exactly at the same time than the other turns 30 deg; holding different devices together);
- Extracting the characteristics (for example features, parameters that describe the movement or motion) of the movement or Movement Data;
- Creating a Descriptor Code characteristic of corresponding movement or motion of at least one device, wherein the Descriptor Code is its own movement or Movement Data of corresponding device without any processing, compressed data or the result of any other algorithm to extract desired information from the movement or Movement Data;
- Defining a central device and at least one sub device of involved two or more devices, wherein the central device is predefined depending on the devices that work together, preferably the Central device is the device with higher computation and battery capacities. In an alternative embodiment of the present method, decentralized distributed communication between involved devices is defined.
- Transmitting Descriptor Code from each sub device to a central device; Comparing the Descriptor Codes from the involved devices by central device and defining an activity status accordingly (e.g. synchronous movement detection, different movements detection, etc.);
- Streaming/Sharing the activity status between the involved devices, after one device learns about motion in different devices it acts autonomously, using detected activity status information for making desired decisions or commands related to interactions or identification processes between two or more involved devices (for example locking/unlocking/pairing/unpairing a device (laptop, smartphone); making an identification; opening a door; lock or unlock the safety mechanisms of doors, gates, computer terminals, personal and industrial robots, but also vehicles, firearms and other smaller and larger devices; or to initiate other commands between different devices (allowing a payment; user authentication, electronic ticketing).

The Movement Data used by each device is obtained directly from sensors on the involved electronic devices, for example an motion sensor, IMU (Inertial Measurement Unit), a linear and/or an angular accelerometer, a magnetometer, a gyroscope, a tilt sensor, etc. or is calculated using indirect measurements, for example a computer vision algorithm of a camera system that may detect movements position and/or hand movements of a tracked user, triangulation/trilateration of body location with radio or camera, a combination of any of the previous or other sources to increase the reliability of the system. I.e. the Movement Data is data which tells how the device is moving.

The involved electronic devices used to implement the present method to interact with each other; for example to lock or unlock the safety mechanisms of doors, gates, computer terminals, personal and industrial robots, but also vehicles, firearms and other smaller and larger devices; or to initiate other commands between different devices (for example electronic payment, user authentication, electronic ticketing, etc.) is electronic device (for example handheld and mobile devices (for example smartphone, remote control, laptop computer, tablet computer, wand, etc.), preferably miniature wearable device (for instance, smart jewelry, smart watch, smart wristband, smart ring, etc.) or implantable device (surgically placed under skin, into teeth, swallowed, etc.)).

Figure 3:
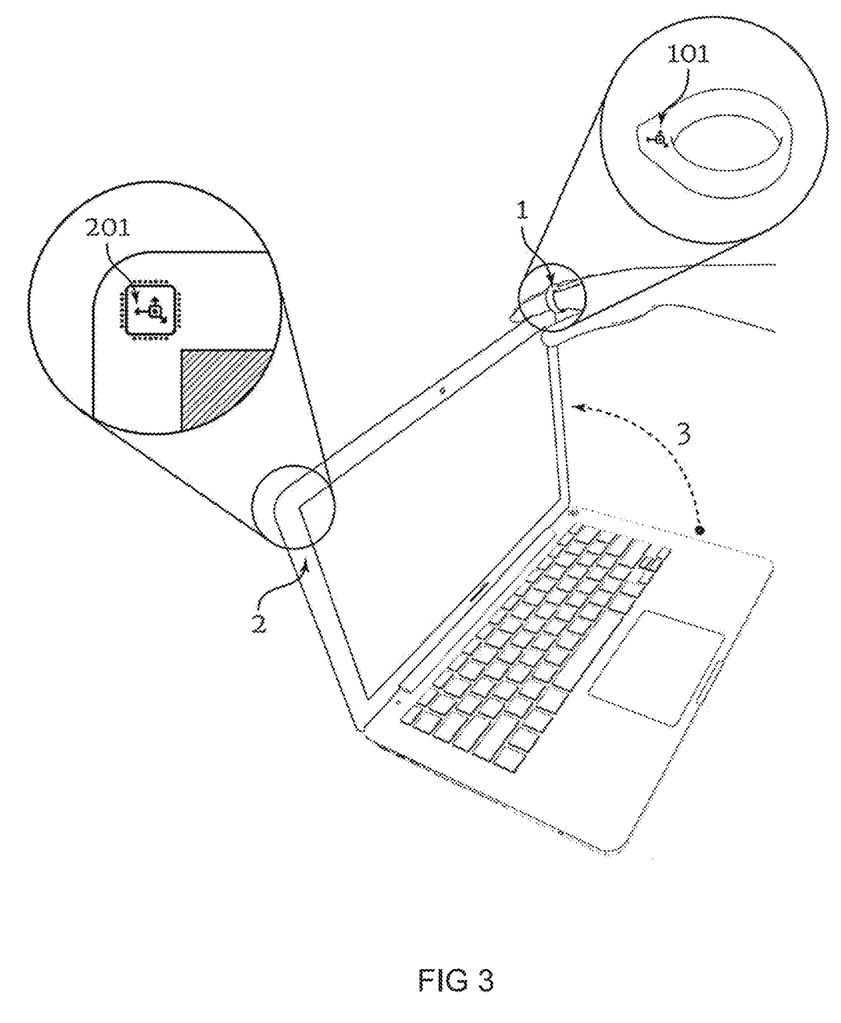
FIG. 3 illustrates an alternative embodiment of the present method for locking/unlocking the computer by using wearable device.

Following examples describe alternative embodiments of the present method:

FIG. 3 illustrates an example of the method according to the present invention for interaction of two electronic devices by detecting movements of first and second electronic device. The second electronic device (for example laptop) 2 comprising a motion sensor 201 is unlocked by using first electronic device (for example wearable device, preferably smart ring) 1 comprising a motion sensor 101. User initiates the movement 3 by opening the laptop's lid and the movement data from the motion sensor of first electronic device, i.e. wearable device 101 and second electronic device, i.e. laptop's lid 201 is acquired, corresponding movement characteristics is extracted, descriptor code is created and activity status shared between the involved electronic devices. The movement information from the wearable device 101 is gathered by the laptop to confirm who is opening the lid and whether the person who intends to unlock the laptop is actually an authorized user to unlock the laptop.

Figure 4:
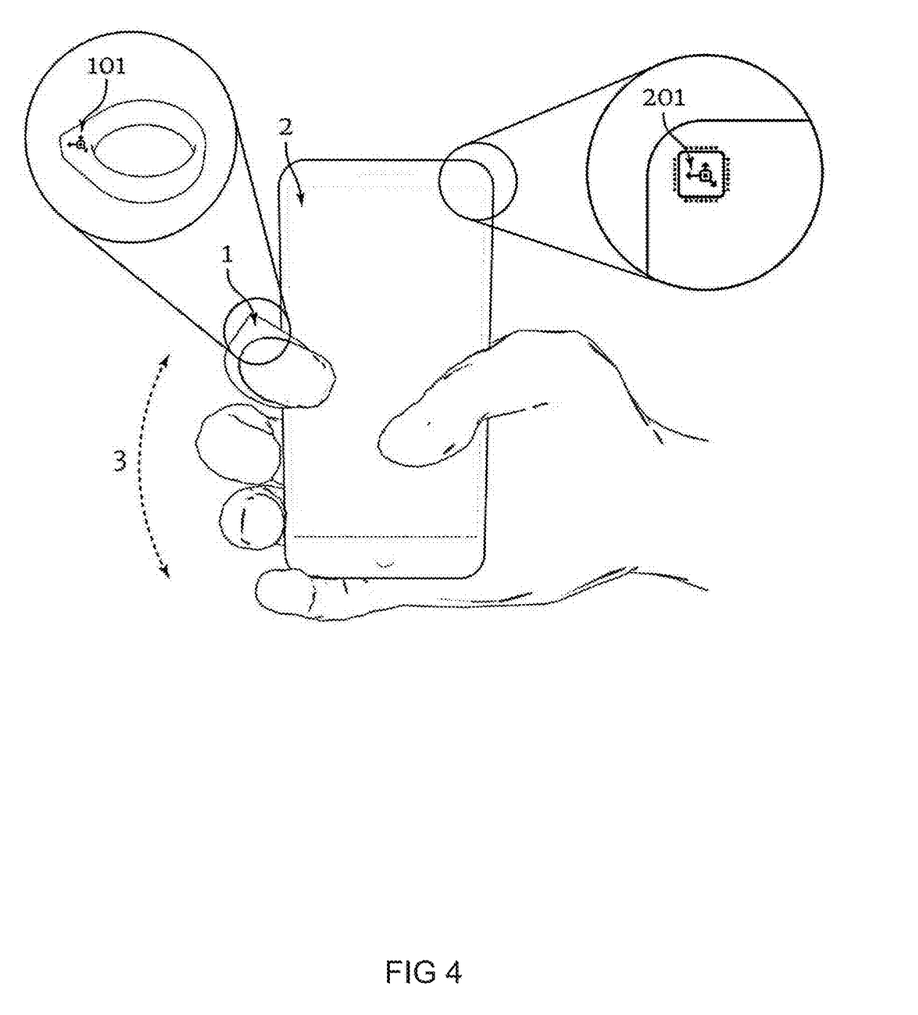
FIG. 4 illustrates an alternative embodiment of the present method for locking/unlock the handheld device by using wearable device.

FIG. 4 illustrates an example of the method according to the present invention for interaction of two electronic devices by detecting movements of first and second electronic device. The second electronic device (for example handheld device or mobile terminal) 2 comprising a motion sensor 201 is unlocked by using first electronic device (for example wearable device, preferably smart ring, 1 comprising a motion sensor 101 moving synchronously 3. The second electronic device 2, based on data acquired from the motion sensor 201 instantly detects whether it's being manipulated by a person who is wearing the first electronic device, for example smart ring, 1. This allows the security context of the second electronic device (e.g. mobile terminal) 2 to be changed, for example, to lock or unlock the screen or just change allowed features or applications. This provides better convenience for the user who otherwise needs to make extra steps to unlock mobile terminal.

Figure 5:
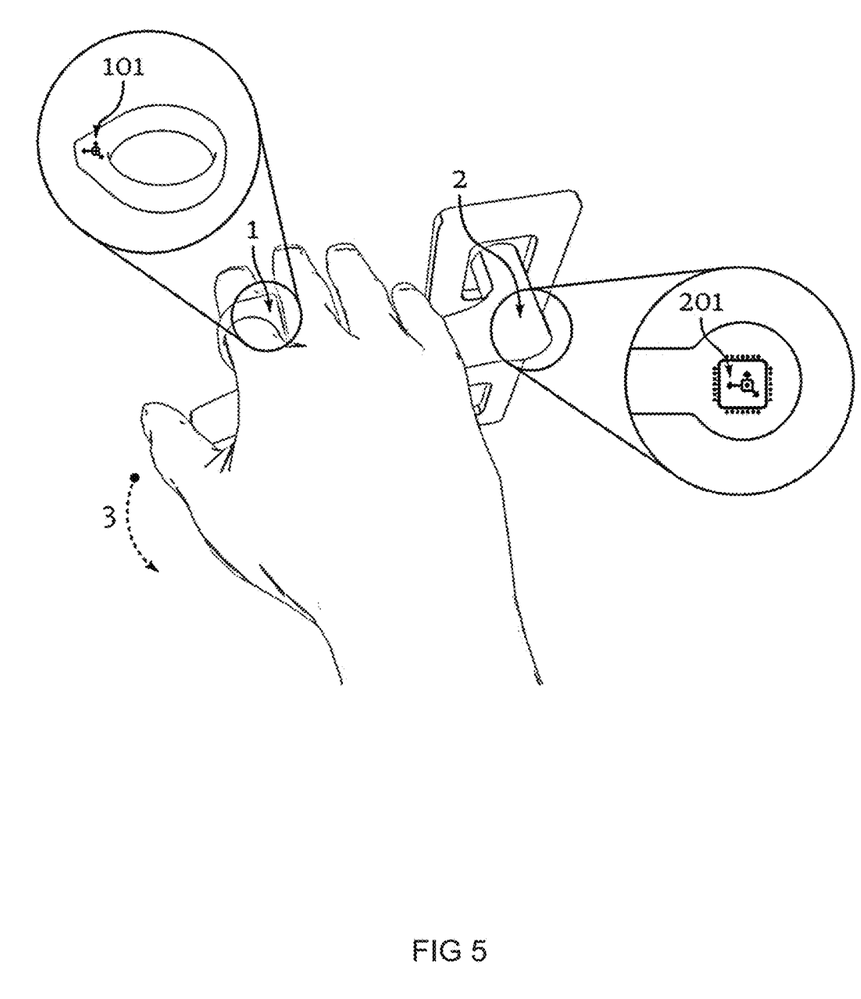
FIG. 5 illustrates an alternative embodiment of the present method for locking/unlocking the door lock or other barriers by using wearable device.

FIG. 5 illustrates an example of the method according to the present invention for interaction of two electronic devices by detecting movements of first and second electronic device, wherein to unlock the second electronic device (for example door lock) 2 comprising motion sensor 201 or other barriers by using first electronic device (for example wearable device, preferably smart ring) 1 comprising motion sensor 101. User initiates the movement 3 by turning or pushing the opening mean of the door lock and the movement data from the motion sensor of first electronic device, i.e. wearable device 101 and second electronic device, i.e. motion sensor 201 of door lock 201 is acquired, corresponding movement characteristics is extracted, descriptor code is created and activity status shared between the involved electronic devices. The movement information from the wearable device 101 is gathered by the door lock to confirm who is opening the door lock and whether the person who intends to unlock the door lock is actually an authorized user to unlock the door lock. In contrast with the known solutions, according to the alternative embodiment of the present method, the possibility of seamless unlocking of any device the user interacts physically (for example smart locks, mobile handheld devices, robot limb actuators, credit cards, etc.) is created.

Figure 6:
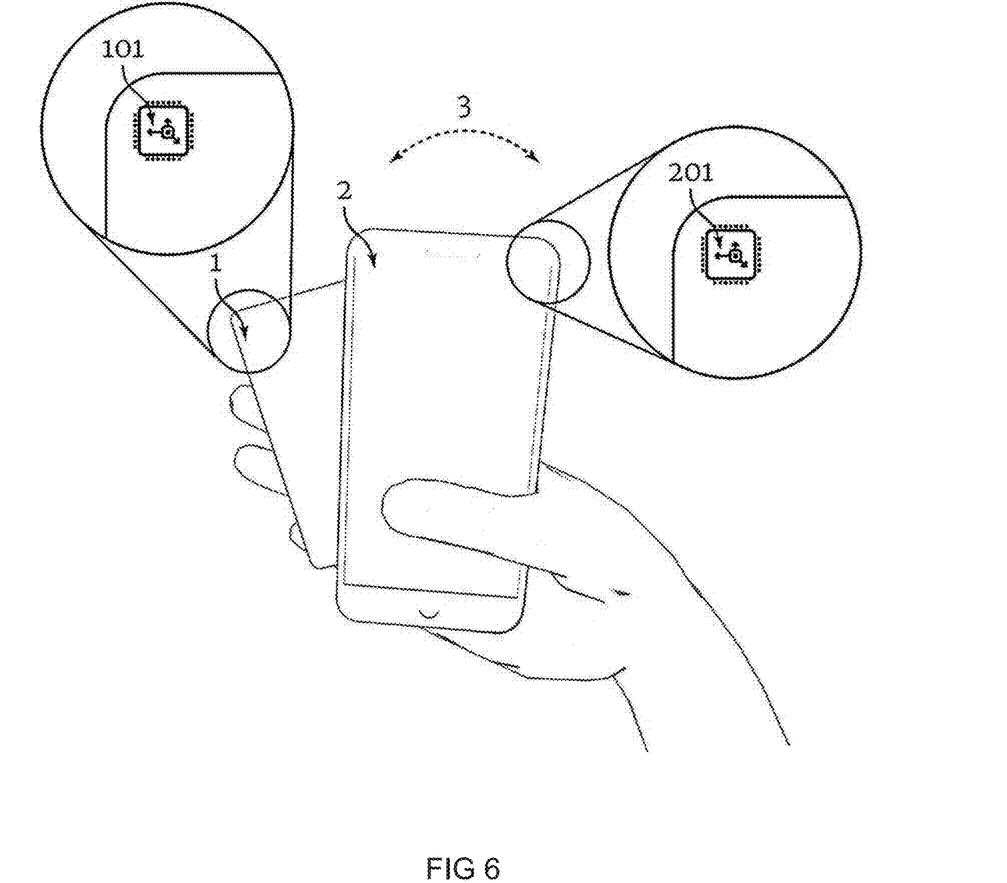
FIG. 6 illustrates an alternative embodiment of the present method for Payment Authentication by using wearable device.

FIG. 6 illustrates an example of the method according to the present invention for interaction of two electronic devices by detecting movements of first and second electronic device, wherein the first electronic device is portable device for example payment card 1 comprising motion sensor 101 and second electronic device 2 is a smartphone or payment acquiring device 2 comprising motion sensor 201, wherein the interaction of the two electronic devices is used for payment authentication. The Payment Authentication is carried out by using a first electronic device, the payment card 1 comprising a motion sensor 101 by user initiated movement 3, wherein the user moves the second electronic device (for example smartphone or a payment acquiring device) 2 comprising a motion sensor 201 and the payment card 1 together. By moving first electronic device 1 and second electronic device 2 together the movement data from the motion sensor of first electronic device 101 and second electronic device 201 is acquired, corresponding movement characteristics is extracted, descriptor code is created and activity status shared between the involved electronic devices. The movement information from the motion sensor of portable device 101 is gathered by the second electronic device 201 and the payment is allowed.

Figure 7:
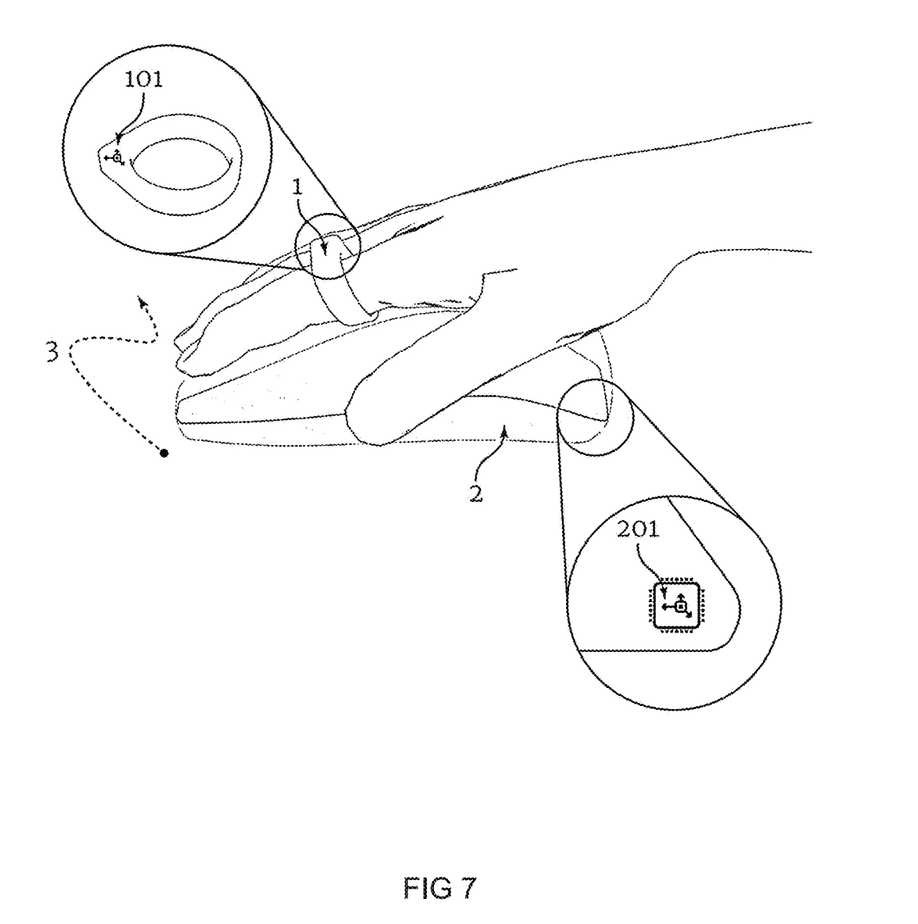
FIG. 7 illustrates an alternative embodiment of the present method for locking/unlocking Computer Terminal by using wearable device.

FIG. 7 illustrates an example of the method according to the present invention for interaction of two electronic devices by detecting movements of first and second electronic device. The second electronic device (for example Computer Terminal comprising a computer mouse) 2 comprising motion sensor 201 is locked/unlocked by using first electronic device (for example wearable device, preferably smart ring) 1 comprising motion sensor 101. User initiates the movement 3 of the second electronic device 2 and the movement data from the motion sensor of first electronic device 101 and second electronic device 201 is acquired, corresponding movement characteristics is extracted, descriptor code is created and activity status shared between the involved electronic devices. The movement information from the wearable device 101 is gathered by the Computer Terminal to confirm who is moving the computer mouse and whether the person who intends to lock or unlock the Terminal is actually an authorized user to lock or unlock the terminal. A wearable device 1, used in combination of computer terminal with computer mouse 2 comprising motion sensor 201, allows to lock/unlock a workstation and/or switch also between the context depending on the owner of the wearable device that is detected as using the mouse. It also permits the auto-lock feature to be activated if the user does not operate the mouse anymore. This can be combined with other presence sensors or methods to detect the user's hand, for instance, to avoid false negatives.

Figure 8:
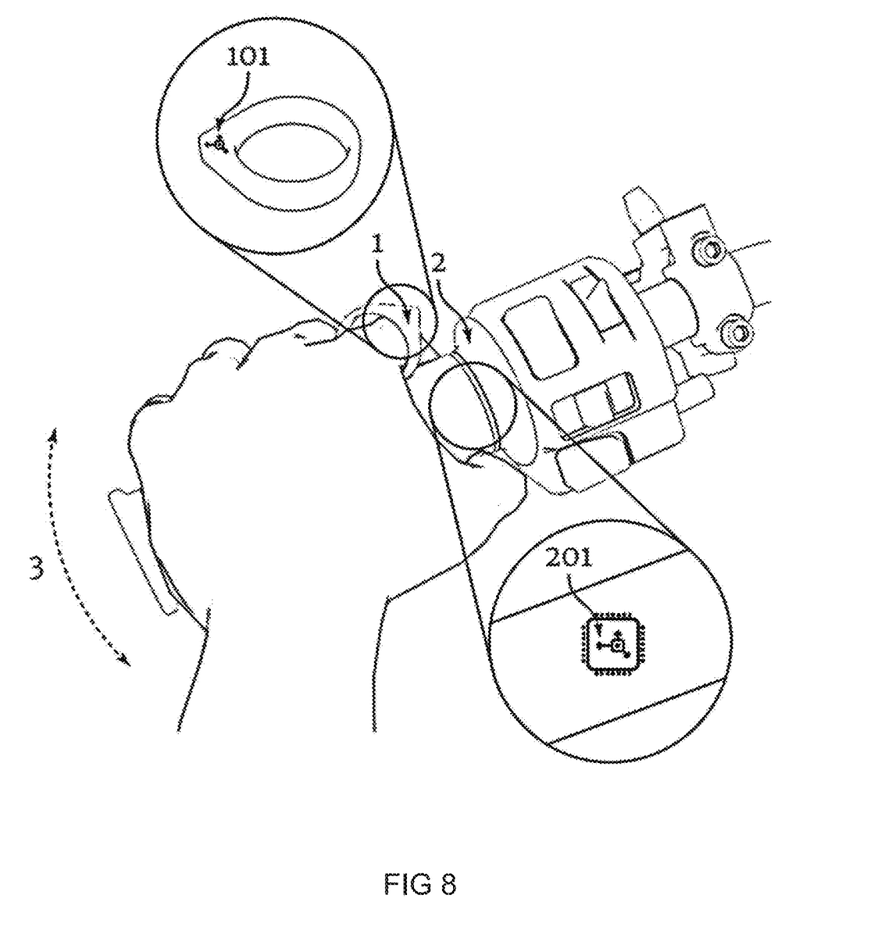
FIG. 8 illustrates an alternative embodiment of the present method for Driver Presence Detection by using wearable device.

FIG. 8 illustrates an example of the method according to the present invention for interaction of two electronic devices by detecting movements of first and second electronic device for Driver Presence detection. The Driver Presence is detected by using first electronic device (for example wearable device, preferably smart ring) 1 comprising motion sensor 101 and second electronic device, for example handlebar or a driving wheel 2 of a vehicle comprising motion sensor 201. User initiates the movement 3 by turning the handle bar 2 and the movement data from the motion sensor of first electronic device 101 and second electronic device 201 of handle bar is acquired, corresponding movement characteristics is extracted, descriptor code is created and activity status shared between the involved electronic devices. The movement information from the wearable device 101 is gathered by the vehicle to detect the driver presence. The synchronous unlocking/locking feature can also be used to detect the presence of hand(s) on the handlebar or a driving wheel 2 of a vehicle. Such a pair of sensors 201 on a driving wheel or a handlebar can be used to detect distress when the rider/driver has lost control over the vehicle (snowmobiles usually have an auto-stop feature that is implemented by connecting a rope between the vehicle and the rider); to detect the driver's ownership or other legal rights to operate the vehicle; to lock or unlock some features, such as speed limiters for inexperienced drivers.

In other alternative embodiments the present method is implemented for example for Firearms Operator Detection; Transportation Ticketing: Be in/Be Out; Industrial Accident Detection; Human to machine interaction.

For Firearms Operator Detection the locking/unlocking mechanisms can potentially be implemented into smart firearms as well for authorization and increased safety of operation. Comparing data from a wearable or implantable device attached to operator's hand, our invention allows to identify whether the operator is authorized to use the firearm and whether the operator is actively engaged in manipulating the firearm. Rapid synchronous motion detection can also increase safety in accident situations, such as disabling the firing functionality while accidentally losing control over the firearm.

For Transportation Ticketing: Be in/Be Out contemporary transportation systems use various versions of "Tap in/Tap out" system for ticketing purposes. In the typical scenario, user identifies herself upon entering the paid zone (station terminal or a bus) with a token (typically some form of NFC). The present method opens possibility for implementing "Be in/Be out" system where user can seamlessly and freely enter any public transportation vehicle without need to perform any authorizing action. The system then detects synchronous motion of a passenger and a vehicle, by which it can retrospectively charge appropriate fare to the user's account.

For Industrial Accident Detection various industrial tools can potentially benefit from present invention by increasing security of operation: accidents where e.g. operator loses control of a power tool, the tool can be rapidly disabled preventing injury of the operator. Similarly, various types of machinery can detect presence of user's hands on controls and disable any operation should the user's hands not be present.

For Human to machine interaction, for example in exoskeletons major approaches use bioelectric signals from muscles or pressure sensors to learn about intention of wearer. With comparing sensor(s) on machine and wearable or implantable sensor it becomes possible to tell if force was applied by human intentionally or some external force has occurred.

The invention claimed is:

1. A method for device interaction and identification by detecting similar or synchronous movements of two or more electronic devices using two or more Movement Data from two or more involved electronic devices to interact with each other and detect when the movement or motion of involved devices corresponds with certain multi-device gestures or activities, comprises following steps:

Defining user activities by acquiring movement or motion data from the sensors of each device of two or more involved devices;

Extracting the characteristics of the movement or motion data;

Creating a Descriptor Code characteristic of corresponding movement or motion of at least one device;

Defining communication between involved devices by defining a central device and at least one sub device of involved two or more devices;

Transmitting Descriptor Code from each sub device to a central device;

Comparing the Descriptor Codes from the involved devices by central device and defining an activity status accordingly;

Streaming/Sharing the activity status between the involved devices and using detected activity status information for making desired decisions or commands related to interactions or identification processes between two or more involved devices.

2. The method according to claim 1, wherein the Descriptor Code is its own movement or motion Data of corresponding device without any processing, compressed data or the result of any other algorithm to extract desired information from the movement or motion Data.

3. The method according to claim 1, wherein the central device is predefined depending on the devices that work together, preferably the Central device is the device with higher computation and battery capacities.

4. The method according to claim 1, wherein defining communication between involved devices is defined by decentralized distributed communication between involved devices is defined.

5. The method according to claim 1, wherein the movement or motion data used by each involved device is obtained directly from sensors on the device.

6. The method according to claim 1, wherein the movement or motion data is calculated by using indirect measurements.

7. The method according to claim 1, wherein the movement or motion data is obtained from triangulation/trilateration of body location with radio or camera.

8. The method according to claim 1, wherein the involved device is miniature wearable device.

9. The method according to claim 1, wherein the involved device is implantable device.

10. The method according to claim 1, wherein the defined user activity is specific coordinated movement between involved devices, moving one involved device in respect of other involved device together, separately or moving one while the other one stays static.

11. The method according to claim 1, wherein characteristics of the movement or motion data is the feature or parameter that describe the movement or motion.

* * * * *